United States Patent
Mason et al.

(10) Patent No.: US 11,555,358 B1
(45) Date of Patent: Jan. 17, 2023

(54) METHOD AND APPARATUS FOR PROTECTION OF CONTROL LINES AND OTHER EQUIPMENT

(71) Applicant: PROFESSIONAL RENTAL TOOLS, LLC, Houston, TX (US)

(72) Inventors: Chris Mason, Broussard, LA (US); Kyle Hollier, Kaplan, LA (US)

(73) Assignee: PROFESSIONAL RENTAL TOOLS, LLC, Houston, TX (US)

( * ) Notice: Subject to any disclaimer, the term of this patent is extended or adjusted under 35 U.S.C. 154(b) by 0 days.

(21) Appl. No.: 17/749,357

(22) Filed: May 20, 2022

Related U.S. Application Data (60) Provisional application No. 63/320,305, filed on Mar. 16, 2022.

(51) Int. Cl.
*E21B 17/00* (2006.01)
*E21B 17/10* (2006.01)
*F16L 3/237* (2006.01)
*E21B 17/01* (2006.01)

(52) U.S. Cl.
CPC .......... *E21B 17/1035* (2013.01); *E21B 17/01* (2013.01); *F16L 3/237* (2013.01)

(58) Field of Classification Search
CPC ........... F16L 3/237; F16L 57/06; E21B 17/01; E21B 17/1035
USPC .......................... 138/110, 108, 159; 166/345
See application file for complete search history.

(56) References Cited

U.S. PATENT DOCUMENTS

| | | | | |
|---|---|---|---|---|
| 3,705,432 A | * | 12/1972 | Watkins, Jr. | E21B 17/012 248/230.1 |
| 3,729,756 A | * | 5/1973 | Cook | E21B 17/012 405/224.2 |
| 4,004,326 A | * | 1/1977 | Beavers | E21B 17/1035 166/241.6 |
| 4,042,023 A | * | 8/1977 | Fox | E21B 17/1042 166/241.7 |
| 4,477,207 A | * | 10/1984 | Johnson | E21B 17/012 166/359 |
| 4,484,785 A | * | 11/1984 | Jackson | E21B 17/1035 138/112 |
| 5,377,752 A | * | 1/1995 | Farrara | E21B 17/1035 166/241.6 |
| 7,210,531 B2 | * | 5/2007 | van Belkom | E21B 17/01 166/359 |
| 7,214,114 B2 | * | 5/2007 | Gibson | E21B 17/012 441/133 |
| 7,762,337 B2 | * | 7/2010 | Papon | E21B 17/1035 166/345 |
| 7,771,245 B2 | * | 8/2010 | Routeau | E21B 17/012 441/133 |

(Continued)

*Primary Examiner* — James F Hook
(74) *Attorney, Agent, or Firm* — Ted M. Anthony (57) ABSTRACT

A protective member at least partially surrounds a desired length of pipe (such as a conventional landing string) and protects "umbilical" control line(s) or bundles, including pipe and umbilical line(s) installed within risers of subsea installations. At least one robust protective shell member is installed around at least a portion of a pipe string and forms at least one elongated channel. At least one umbilical control line is disposed within the elongated channel and is shielded against damage from inadvertent or unwanted abrasion, impact or other forces.

10 Claims, 6 Drawing Sheets

(56) References Cited

U.S. PATENT DOCUMENTS

| | | | | |
|---|---|---|---|---|
| 8,540,029 B2* | 9/2013 | McMiles | ............... | E21B 17/01 |
| | | | | 166/359 |
| 8,752,633 B2* | 6/2014 | Whitelaw | ........... | E21B 17/1035 |
| | | | | 166/241.6 |
| 8,875,792 B2* | 11/2014 | Whitelaw | ............... | F16L 3/237 |
| | | | | 166/345 |
| 2004/0062612 A1* | 4/2004 | van Belkom | ........... | E21B 19/00 |
| | | | | 405/224.2 |
| 2004/0175240 A1* | 9/2004 | McMillan | ............... | E21B 17/01 |
| | | | | 405/211 |

* cited by examiner

METHOD AND APPARATUS FOR PROTECTION OF CONTROL LINES AND OTHER EQUIPMENT

BACKGROUND OF THE INVENTION

1. Field of the Invention

The present invention pertains to a protective casing or enclosure apparatus for protecting certain equipment disposed within a riser of a subsea installation. More particularly, the present invention pertains to a protective apparatus for shielding "umbilical" control line(s) that are secured to a pipe string disposed within a riser (such as, for example, a riser connecting a floating vessel to a subsea installation).

2. Brief Description of the Related Art

Oil and gas wells are increasingly being drilled in more challenging environments. In many cases, offshore wells are drilled, completed and/or worked over using floating vessels such as semi-submersible drilling rigs, drill ships and the like. Further, many such wells are completed using "subsea" completion equipment. In such instances, subsea wellheads and related equipment are situated at or near the sea floor, while an extensive array of flow lines and umbilical control lines connect said subsea equipment to floating production facilities, pipeline interconnection points and/or other subsea completions.

It is often beneficial to conduct downhole operations in oil and/or gas wells, including subsea wells. In such subsea wells, operations are frequently conducted from a floating vessel, such as a drill ship or floating production platform that is positioned at the surface of the water. A tubular conduit—commonly known as a "riser"—can be used to connect the floating vessel (typically situated at the water's surface) with a subsea wellhead (typically situated at or near the sea floor). Among other uses, the riser provides a pathway for conveying tools and other equipment between a floating vessel and a subsea well, as well as a containment structure for fluids (such as, for example, drilling mud). In certain circumstances, a riser can also be equipped with a tensioner to provide near constant tension force that is adequate to maintain the stability of the riser; the amount of tension required depends on a number of different factors including, without limitation, the weight and buoyancy of the riser, the forces from waves and currents, and the weight and characteristics of any fluids contained within the riser.

In many cases, a length of threaded pipe is also installed within a drilling riser. Such threaded pipe, sometimes referred to as a landing string, can comprise a plurality of pipe sections that are joined together in end-to-end relationship using mating threaded connections; the pipe is lowered through the rotary table of a rig or other floating vessel and into a drilling riser situated below. Frequently, operations in subsea wells are conducted through the inner bore of said landing string using a continuous length of flexible tubing and/or wireline. Similarly, wireline (including, without limitation, slickline, braided line or electric line) is also stored on a reel, and can be translated in and out of the inner bore of said landing string in a virtually continuous manner using an array of beneficially positioned sheaves or pulleys.

Many different downhole tools and other devices can also be installed into a subsea well installation via a drilling riser. Such tools and other devices are frequently operated using a "control line"—typically to provide either a signal, power, or both—in order to operate said downhole tool(s) or device(s), and/or to serve as a conduit for communication transmission between the deployed equipment and the surface of the well. Such control lines can provide electrical, hydraulic, and/or fiber optic means of signal transmission, control and power. Frequently, multiple control lines are run together in a bundle, which is often referred to as an "umbilical" or "umbilical line".

Generally, the interior space of a landing string or other tubular string must remain unobstructed in order for fluids and other devices to pass through said interior space. As such, control lines and umbilical lines are frequently run into a riser along an outer surface (not the interior space) of the landing string or other tubular string. For example, a tubular landing string may be installed into a riser through an opening in a vessel; as the tubular landing string is inserted into a riser through said opening in a vessel, an umbilical control line may be inserted into the riser adjacent to the external surface of the tubular landing string. An umbilical control line can be affixed to the external surface of the tubular landing string along a portion of the length of said tubular landing string using clamps or the like in order to keep the umbilical control line and the tubular landing string together, and to prevent said umbilical control line from being pulled away from the tubular landing string during its trip into the riser.

In order to perform such intervention and/or completion activities (including, without limitation, continuous tubing operations, wireline operations and/or hydraulic workover unit/snubbing operations) it is frequently beneficial to utilize a motion compensation system. Generally, such motion compensation systems allow downhole intervention or completion operations to be performed from a floating rig or vessel, while accounting for or offsetting wave motion of the sea and heaving motion of a floating rig or vessel. Put another way, the motion compensation systems allow a tubular landing string and any attached umbilical control line to remain substantially stationary relative to a surrounding riser, while a supportive floating rig or vessel moves due to wave motion of the sea.

During such operations, the supportive floating rig or vessel can move relative to an attached riser and underlying well, as well as any tubular landing string and any attached umbilical control line disposed within said riser/well. This movement can result in unwanted contact or abrasion by said riser or vessel against the outer surface of the tubular string and, more importantly, the umbilical control line disposed along the outer surface of said tubular landing string. Such abrasion can give rise to severe friction, impact or other force(s) acting on said umbilical control line which can cause damage to said umbilical control line. In extreme cases, such force(s) can sever the umbilical control line or significantly degrade its integrity, thereby reducing or destroying the ability to remotely control downhole devices or tools with said umbilical control line.

Thus, there is a need for an effective means for protecting the outer surface of a tubular string and any attached control line and/or umbilical line installed in a riser of a floating drilling rig or other vessel against damage from unwanted abrasion, impact or other forces. Further, such protective means should be affordable, easy to use and effective, with little or no ancillary equipment required.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
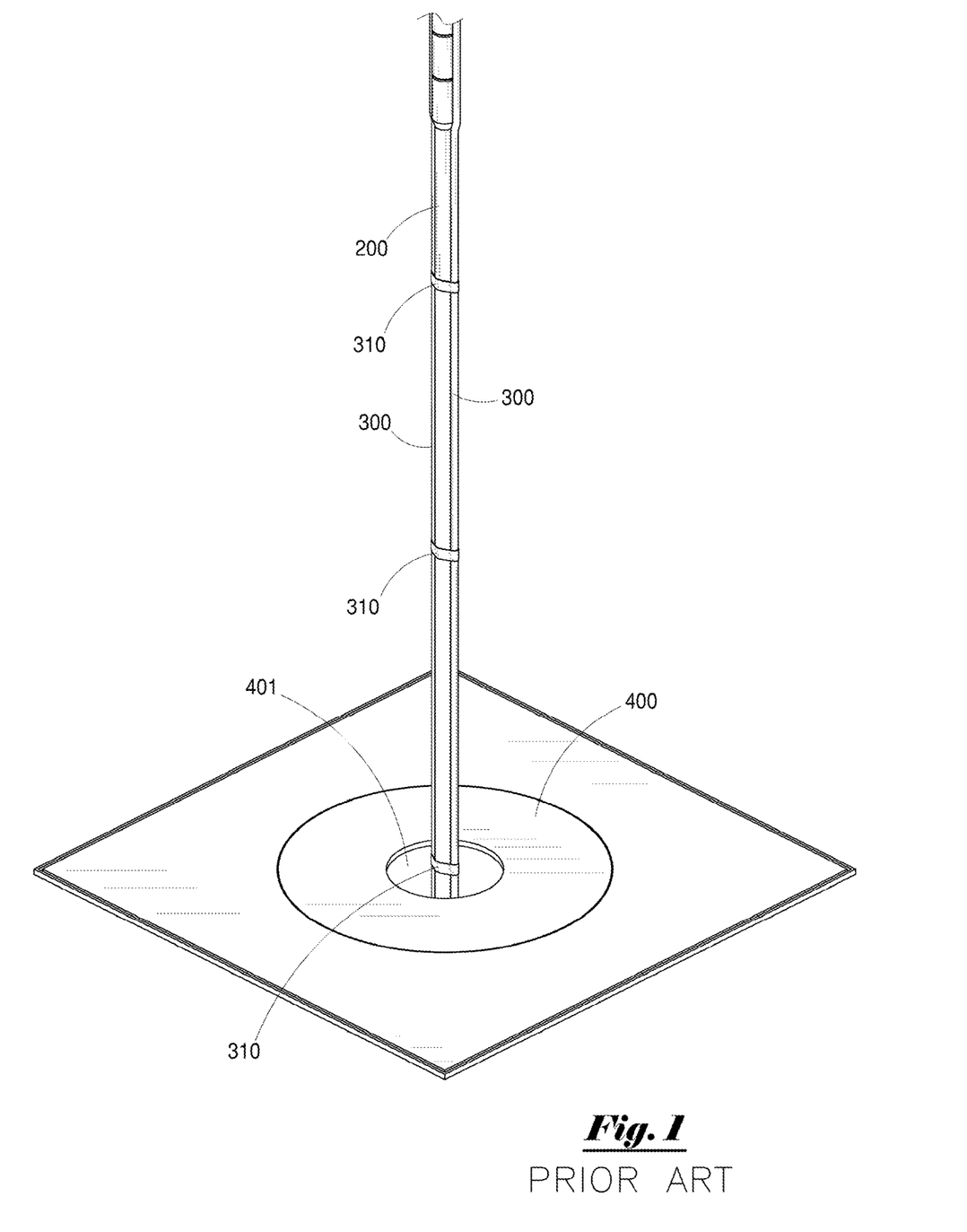
FIG. 1 depicts a side perspective view of a landing string with attached umbilical being lowered into the rotary table of a drilling vessel.

FIG. 1 depicts a side perspective view of a tubular landing string 200 with attached umbilical lines 300 being lowered into the upper opening 401 of a rotary table 400 of a floating drilling rig or other vessel. Although not visible in FIG. 1, it is to be understood that opening 401 of rotary table 400 leads into to the upper opening of a riser and, ultimately, into a subsea wellhead installation and wellbore situated below.

Each of said conventional umbilical lines 300 generally comprises a plurality or bundle of individual control lines that can be used to provide electrical, hydraulic, and/or fiber optic means of signal or data transmission, control and/or power from the surface (such as a drilling rig or vessel) to a downhole tool or device. Said individual control lines can be beneficially wrapped within an outer casing in order to protect and bundle said control lines for easier handling. Further, said conventional umbilical lines 300 can be secured to the outer surface of tubular landing string 200 using bands 310 or other attachment means; as depicted in FIG. 1, the longitudinal axes of umbilical lines 300 and landing string 200 are oriented substantially parallel to one another.

Wave motion can cause rotary table 400 of a drilling rig or other floating vessel to move relative to tubular landing string 200 and attached umbilical lines 300 disposed within said opening 401 of said rotary table 400 (as well as any attached riser/well, not visible in FIG. 1). Such movement can result in unwanted contact or abrasion against the outer surface of said tubular landing string 200 and, more importantly, umbilical lines 300 secured to the outer surface of said tubular landing string 200. Such abrasion can give rise to severe friction, impact and/or other force(s) acting on said umbilical lines 300 which can cause damage to said umbilical lines 300. In certain circumstances such force(s) can sever said umbilical lines 300 or significantly degrade the integrity of said umbilical lines 300 (including, without limitation, individual control lines situated therein), thereby reducing or destroying the ability to remotely control downhole devices or tools using one or more of said umbilical lines 300.

Figure 2:
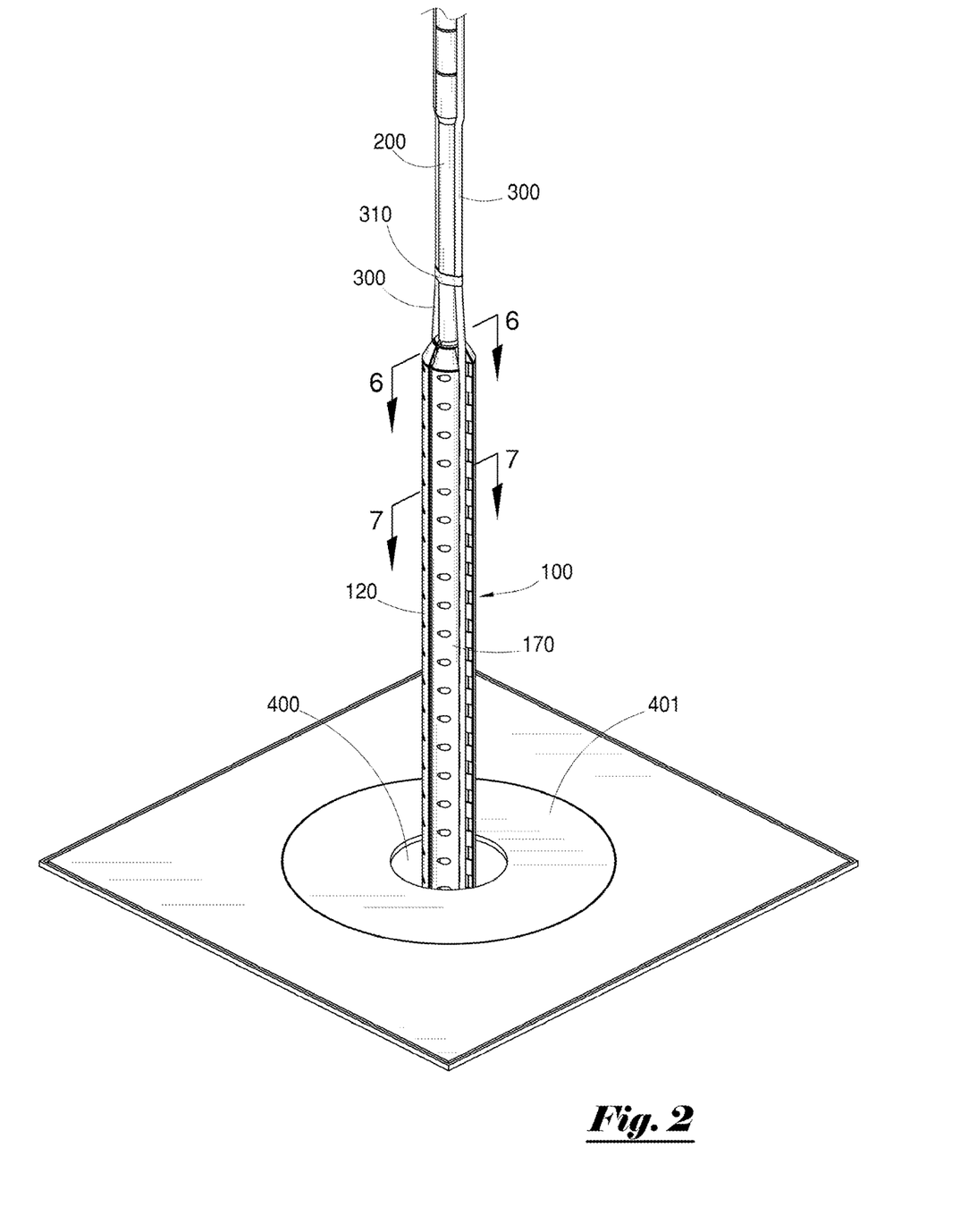
FIG. 2 depicts a side perspective view of a landing string with attached umbilical equipped with the encasement apparatus of the present invention being lowered into the rotary table of a drilling vessel.

FIG. 2 depicts a side perspective view of a tubular landing string 200 with attached umbilical lines 300 and protective encasement apparatus 100 being lowered into the upper opening 401 of a rotary table 400 of a floating drilling rig or other vessel. Although protective encasement apparatus 100 of the present invention can be installed on other types of pipe or tubular string without departing from the scope of the present invention, it is to be observed that tubular landing string 200 depicted in FIG. 2 can comprise a section of a conventional tubular landing string, wherein said landing string 200 comprises a plurality of threaded pipe sections or segments that are joined together in end-to-end arrangement.

Figure 3:
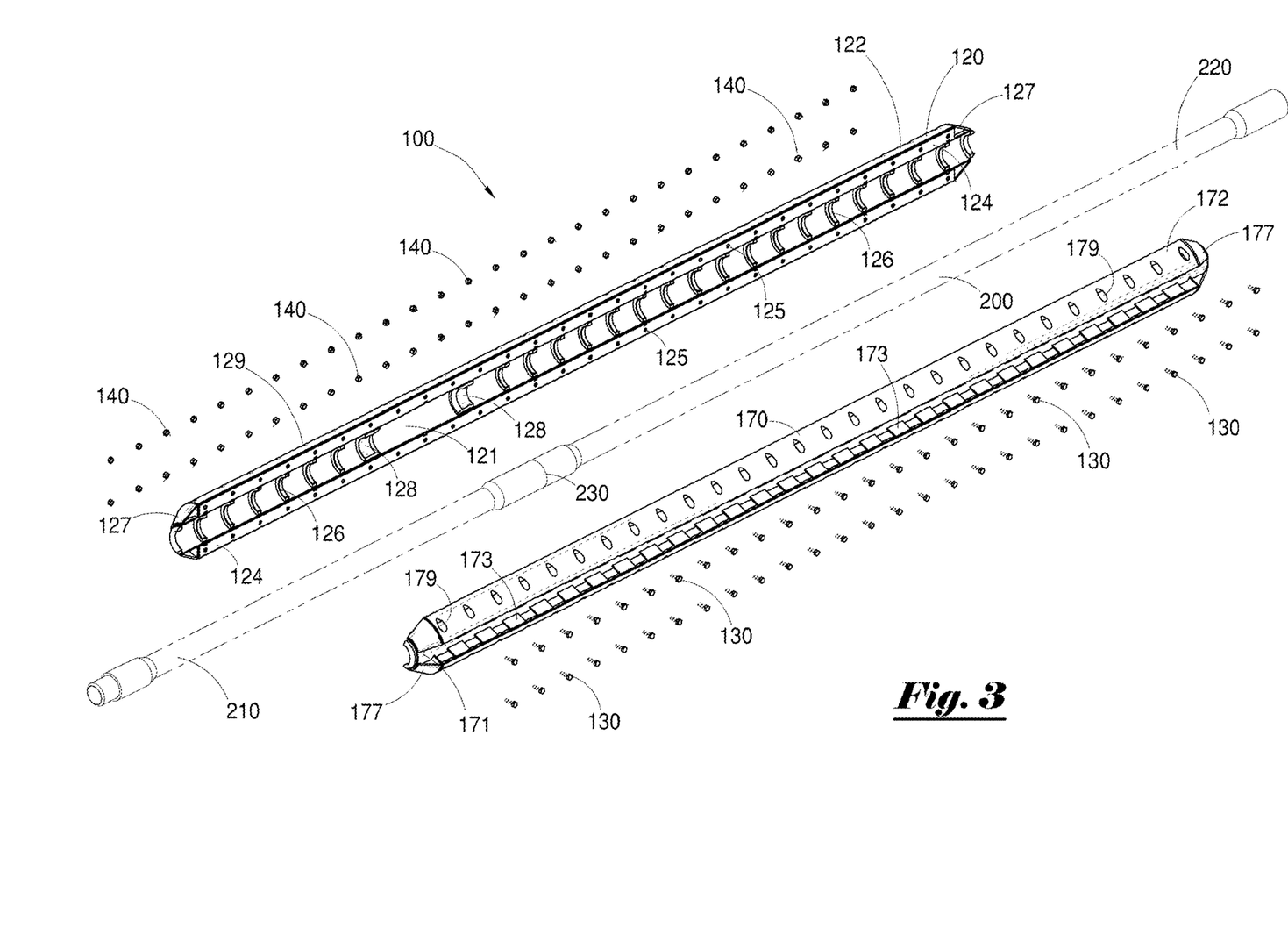
FIG. 3 depicts an exploded perspective view of an encasement apparatus of the present invention.

FIG. 3 depicts an exploded perspective view of an encasement apparatus 100 of the present invention. In a preferred embodiment, said protective encasement apparatus 100, when assembled, comprises an elongated, substantially cylindrical member that can be installed around the outer surface of at least one length of pipe or other elongated member. In a preferred embodiment, protective encasement apparatus 100 of the present invention generally comprises two mating semi-cylindrical half members—first encasement member 120 and second encasement member 170—which can be selectively joined together in opposing arrangement around the outer surface of a portion of a pipe string (such as, for example, attached pipe segments 210 and 220). When joined, threaded connections of pipe sections 210 and 220 combine to form "tool joint" 230 therebetween, which is well known to those having skill in the art.

Notwithstanding the foregoing, it is to be understood that said protective apparatus can comprise a single encasement member that can be selectively expanded to receive a pipe string and then closed to at least partially wrap around said pipe. For example, such an encasement member can comprise at least one hinge or flexible material. Alternatively, said protective apparatus can comprise more than two encasement members, and said encasement members need not be generally semi-cylindrical in shape.

Still referring to FIG. 3, first encasement member 120 comprises inner semi-cylindrical member 121, outer protective shell members 122, stand-off support members 123 (that are disposed between said inner member 121 and outer shell members 122), elongated attachment surfaces 124, and tapered end shoulders 127. Each of said outer protective shell members 122 can comprise a sturdy and impact-resistant material to absorb shock from impact with external objects—such as against the inner surface of a vessel's rotary table, riser, subsea equipment—while protecting an umbilical line disposed within protective encasement apparatus 100 of the present invention. A plurality of spaced-apart spacer shims or brace members 126 are also disposed along the inner surface of inner member 121. Said spacer shims 126 can be beneficially sized to accommodate pipe (including diameter dimensions) used in landing string 200, such as pipe sections 210 and 220, and arranged in spaced relationship to provide desired support between said components.

Figure 4A:
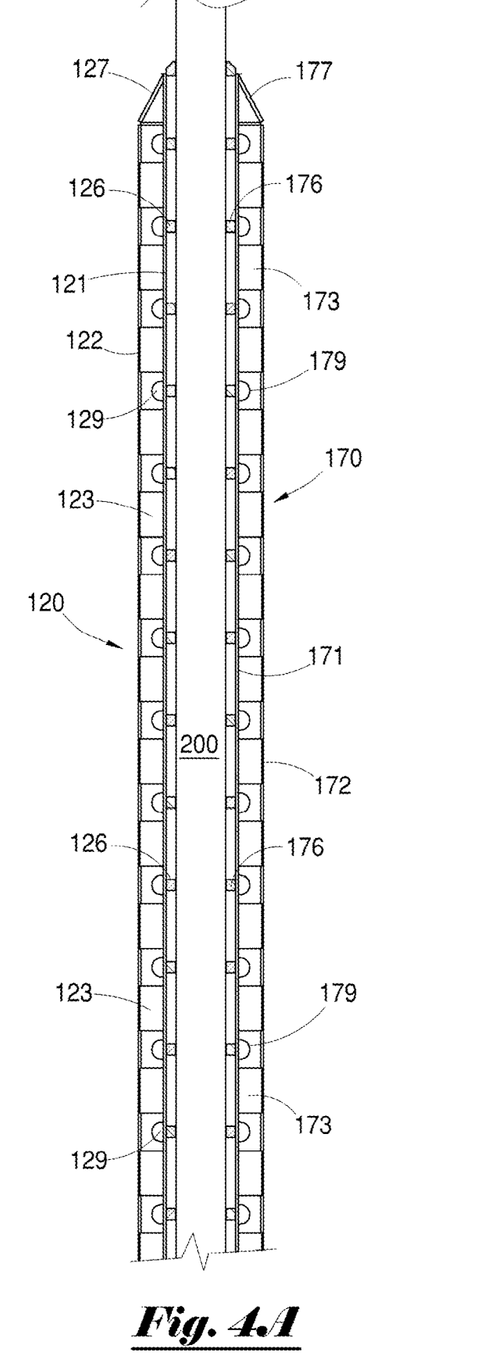
FIGS. 4A and 4B depict a side sectional view of an encasement apparatus of the present invention, along line 4-4 of FIG. 6.
Figure 4B:
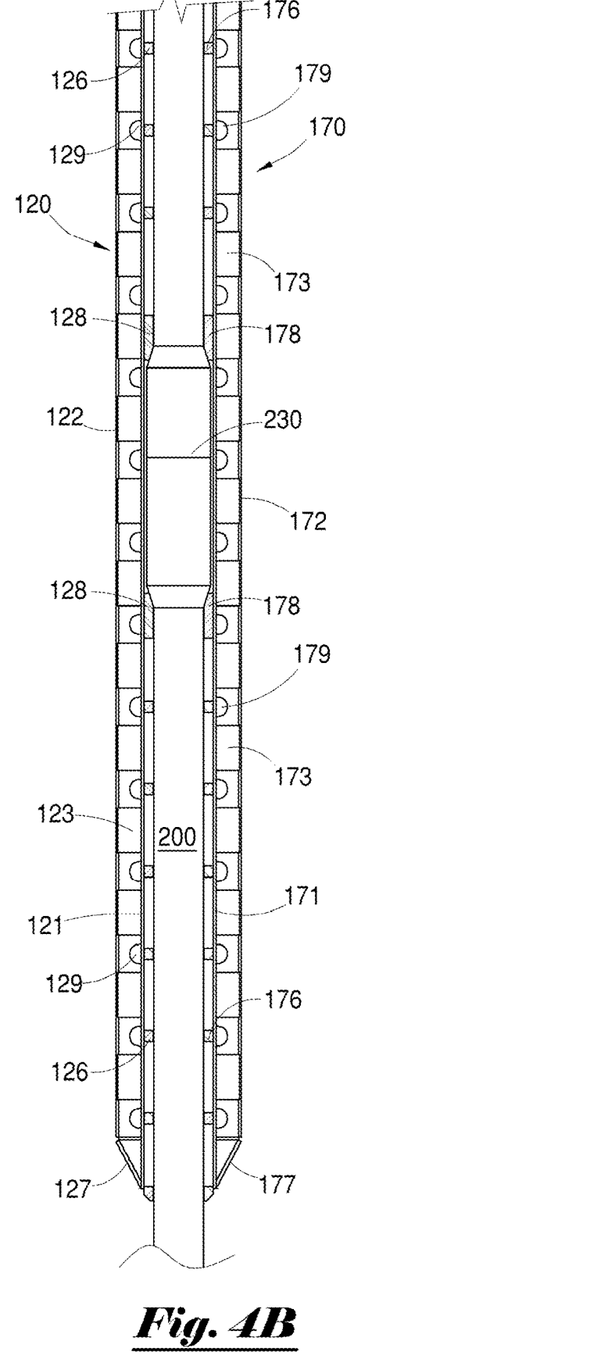

Similarly, semi-cylindrical second encasement member 170 comprises inner semi-cylindrical member 171, outer protective shell members 172, stand-off support members 173 (disposed between said inner member 171 and outer members 172), and tapered end shoulders 177. Each of said outer protective shell members 172 also comprises a sturdy and impact-resistant material to absorb shock from impact while protecting an umbilical line disposed within protective encasement apparatus 100 of the present invention. Although not visible in FIG. 4, a plurality of spaced-apart spacer shims or brace members are also disposed along the inner surface of inner member 171 and are beneficially sized and arranged in spaced relationship to accommodate pipe (including diameter dimensions) used in landing string 200.

Additionally, internal tapered shoulders 128 are disposed along the inner surface of said inner semi-cylindrical member 121 and are longitudinally spaced apart a desired distance to receive a tool joint (such as tool joint 230) of a pipe string 200. Spaced-apart bores 125 extend through elongated attachment surfaces 124. Countersunk bores 179 extend through outer protective shell members 172 and are generally aligned with said spaced apart bores 125. Mechanical fasteners can be used to secure first encasement member 120 to second encasement member 170 in opposed and mating relationship around the outer surface of a pipe string, such as landing string 200.

Although other fastening means can be utilized without departing from the scope of the present invention, said mechanical fasteners comprise a plurality of threaded bolts 130 and mating threaded nuts 140. Torque forces applied to bolts 130 and mating nuts 140 act to provide clamping force to draw first encasement member 120 and second encasement member 170 together around pipe section(s) 210 and 220. An optional cotter pin can be employed to prevent each nut 140 from inadvertently releasing or unscrewing from a mating bolt 130.

FIGS. 4A and 4B depict a side sectional view of an encasement apparatus of the present invention, along line 4-4 of FIG. 6. Semi-cylindrical first encasement member 120 comprises inner semi-cylindrical member 121, outer protective shell members 122, stand-off support members 123, and tapered end shoulders 127. Similarly, semi-cylindrical second encasement member 170 comprises inner semi-cylindrical member 171, outer protective shell members 172, stand-off support members 173 and tapered end shoulders 177.

A plurality of spaced-apart spacer shims or brace members 126 are disposed along the inner surface of inner member 121, while a plurality of spaced-apart spacer shims or brace members 176 are also disposed along the inner surface of inner member 171. Said spacer shims 126 and 176 are beneficially sized to accommodate pipe (including diameter dimensions) of landing string 200 and positioned to provide desired support and strength between said components. Additionally, internal tapered shoulders 128 and 178 are disposed along the inner surfaces of said inner semi-cylindrical members 121 and 171, respectively. Said internal tapered shoulders 128 and 178 are longitudinally spaced apart a desired distance to receive a tool joint 230 of a pipe string 200. Countersunk bores 179 extend through outer protective shell members 172, while countersunk bores 129 extend through outer protective shell members 122. Said countersunk bores are generally aligned with each other.

Figure 5A:
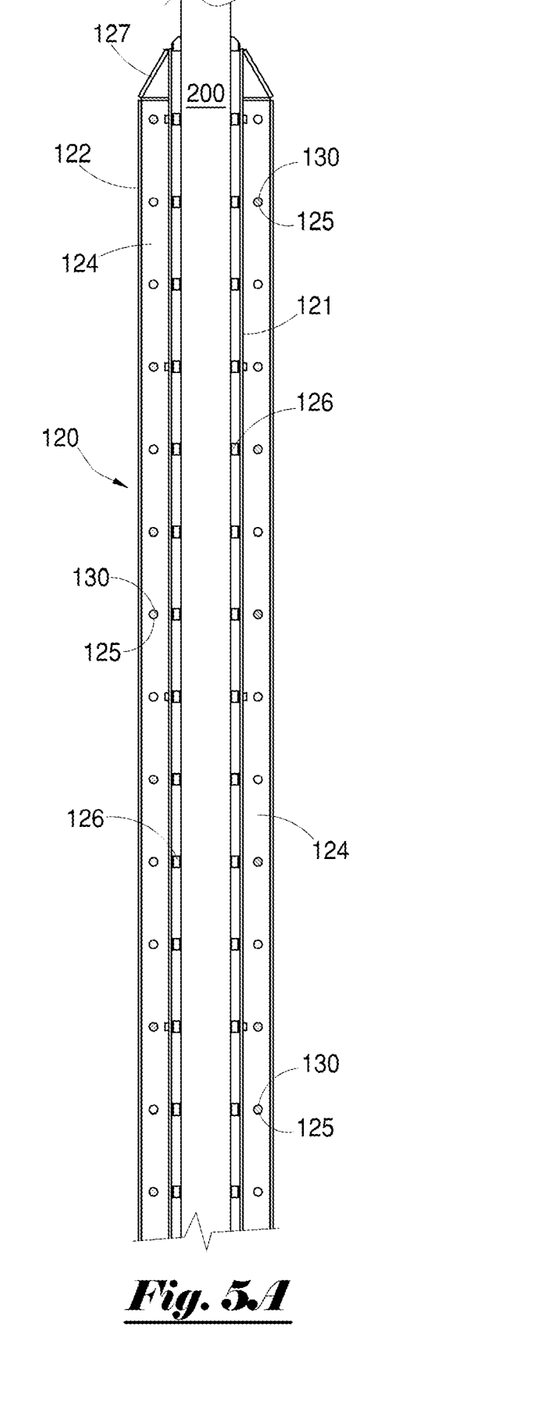
FIGS. 5A and 5B depict a side sectional view of an encasement apparatus of the present invention, along line 5-5 of FIG. 6.
Figure 5B:
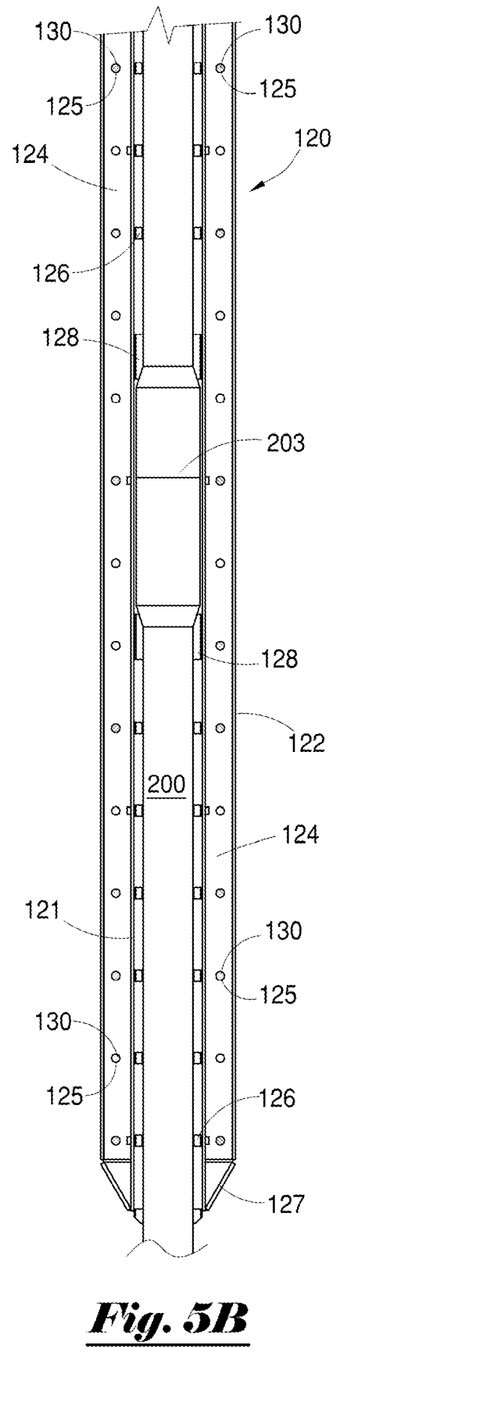

FIGS. 5A and 5B depict a side sectional view of an encasement apparatus of the present invention, along line 5-5 of FIG. 6. Semi-cylindrical first encasement member 120 comprises inner semi-cylindrical member 121, outer protective shell members 122, stand-off support members 123, elongated attachment surfaces 124, and tapered end shoulders 127. Spaced-apart bores 125 extend through elongated attachment surfaces 124.

A plurality of spaced-apart spacer shims or brace members 126 are disposed along the inner surface of inner member 121. Said spacer shims 126 are beneficially sized to accommodate pipe (including diameter dimensions) of landing string 200 and positioned to provide desired support between said components. Additionally, internal tapered shoulders 128 are disposed along the inner surface of said inner semi-cylindrical member 121, and are longitudinally spaced apart a desired distance to receive a tool joint 230 of a pipe string 200.

Figure 6:
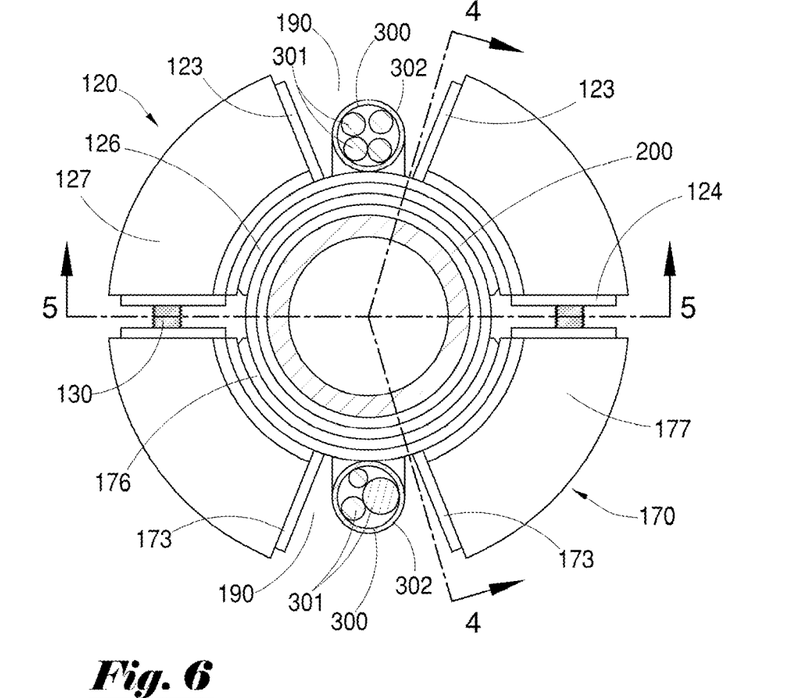
FIG. 6 depicts a sectional view of an encasement apparatus of the present invention, along line 6-6 of FIG. 2.

FIG. 6 depicts a sectional view of an encasement apparatus 100 of the present invention, along line 6-6 of FIG. 2. It is to be observed that said semi-cylindrical first encasement member 120 and second encasement member 170 each define an elongate channel or gap 190 extending along the longitudinal axis of said semi-cylindrical first and second encasement members. In a preferred embodiment, said channel 190 extends along substantially the entire length of said first encasement member 120 and second encasement member 170. At least one umbilical line 300 can be received within each of said elongate channel(s) 190 and, thus, can extend for a desired distance substantially parallel to the longitudinal axis of tubular landing string 200.

It is to be observed that said conventional umbilical line 300 generally comprises a plurality of individual control lines 301 that can be used to provide electrical, hydraulic, and/or fiber optic means of signal or data transmission, control and/or power from the surface (such as a drilling rig or vessel) to a downhole tool or device. Said control lines 301 can be beneficially wrapped within an outer casing 302 in order to protect and bundle said control lines 301 for easier handling.

Figure 7:
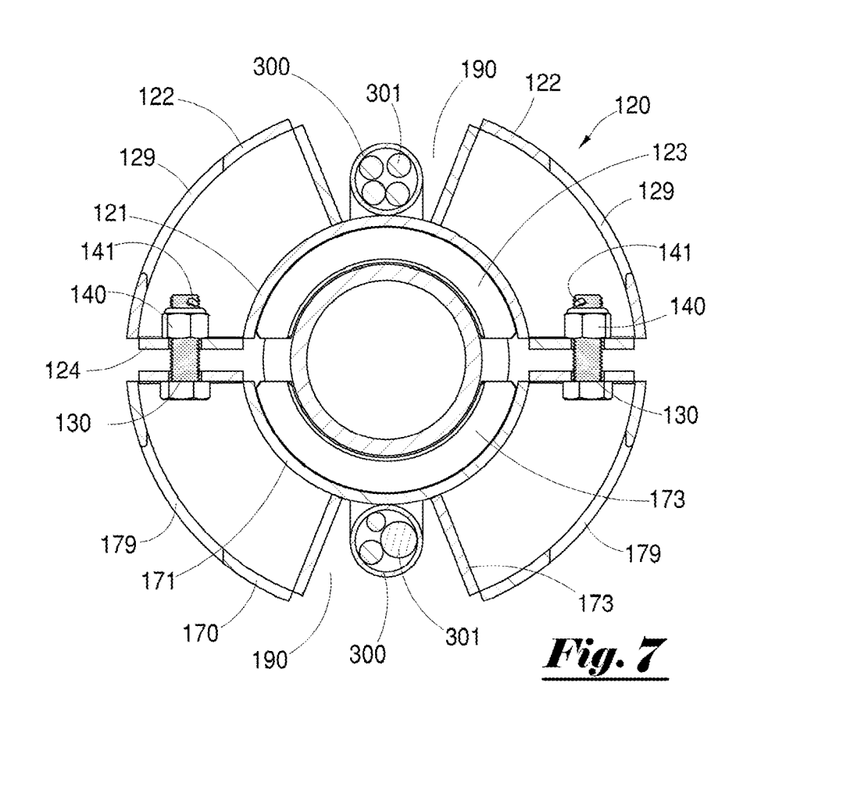
FIG. 7 depicts a sectional view of an encasement apparatus of the present invention, along line 7-7 of FIG. 2.

FIG. 7 depicts a sectional view of an encasement apparatus 100 of the present invention, along line 7-7 of FIG. 2. Semi-cylindrical first encasement member 120 comprises inner semi-cylindrical member 121, outer protective shell member 122, stand-off support members 123. Similarly, semi-cylindrical second encasement member 170 comprises inner semi-cylindrical member 171, outer protective shell member 172, and stand-off support members 173. A plurality of threaded bolts 130 and mating threaded nuts 140 secure said semi-cylindrical first encasement member 120 and second encasement member 170 together around tubular string 200. Nuts 140 can be further secured in place using cotter pins 141. Torque force applied to bolts 130 and mating nuts 140 acts to provide clamping force to draw first encasement member 120 and second encasement member 170 together around pipe 200.

Semi-cylindrical first encasement member 120 and semi-cylindrical second encasement member 170 each define an elongate channel 190 extending along the longitudinal axis of said semi-cylindrical first and second encasement members. At least one umbilical line 300, each comprising a plurality of bundled control lines 301, is received within each of said elongate channel 190.

In operation, protective encasement apparatus 100 of the present invention can be installed on a length of jointed pipe (including, without limitation, a tubular landing string). At least one control line or umbilical line 300 can be disposed within elongate channel 190 formed by said encasement apparatus 100; in this position, said at least one control line or umbilical line 300 does not extend radially outward beyond the outer surface(s) of outer protective shell members 122 or 172. Said at least one control line or umbilical line 300 can be secured to said outer surface of said tubular string 200 in order to provide an effective means for protecting the outer surface of said tubular string 200—and, importantly, any attached control line or umbilical line 300 secured to said outer surface of said tubular string 200— against damage from unwanted contact with other objects, abrasion, impact or other forces. Said protection is particularly important when said tubular string 200, any attached control line or umbilical line 300, and protective encasement apparatus 100, is installed within a riser of a floating drilling rig or other vessel. Further, protective encasement apparatus 100 of the present invention is affordable, easy to use and effective, with little or no ancillary equipment or specialized training required for installation or removal.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An encasement apparatus for shielding at least one umbilical line disposed along an external surface of a pipe section having at least one tube body and at least one tool joint, wherein said protective apparatus comprises:
   a) a first encasement member disposed against said pipe section over at least one tube body and at least one tool joint, and having a first elongated and recessed channel extending along the entire length of said first encasement member, wherein said first elongated channel defines a radially-outwardly facing opening along the entire length of said first elongated channel;
   b) a second encasement member disposed against said pipe section over at least one tube body and at least one tool joint, and removably attached to said first encasement member, wherein said second encasement member has a second elongated channel extending along the entire length of said second encasement member defining a radially-outwardly facing opening along the entire length of said second elongated channel, and wherein said radially-outwardly facing opening of said second elongated channel is phased about 180 degrees around the circumference of said pipe section from said radially-outwardly facing opening of said first elongated channel;
   wherein said at least one umbilical line is disposed in said first or second elongated channels.

2. The protective apparatus of claim 1, wherein said first encasement member defines a first outer surface, said second encasement member defines a second outer surface, and said at least one umbilical line does not extend radially outward beyond said first and second outer surfaces.

3. The protective apparatus of claim 2, wherein said first and second encasement members protect said at least one umbilical line while said pipe section is installed within a riser of a floating drilling rig or other floating vessel.

4. The protective apparatus of claim 1, wherein said first and second encasement members protect said umbilical line against damage caused by contact with other objects.

5. The protective apparatus of claim 1, wherein said first and second encasement members are attached to each other using at least one mechanical fastener.

6. A method for protecting an umbilical line disposed along an external surface of a pipe section having at least one tube body and at least one tool joint, comprising:
   a) attaching an encasement apparatus to said pipe section, wherein said encasement apparatus comprises:
      (i) a first encasement member disposed against said pipe section over at least one tube body and at least one tool joint, and having a first elongated and recessed channel extending along the entire length of said first encasement member, wherein said first elongated channel defines a radially-outwardly facing opening along the entire length of said first elongated channel;
      (ii) a second encasement member disposed against said pipe section over at least one tube body and at least one tool joint, and removably attached to said first encasement member, wherein said second encasement member has a second elongated channel extending along the entire length of said second encasement member defining a radially-outwardly facing opening along the entire length of said second elongated channel, and wherein said radially-outwardly facing opening of said second elongated channel is phased about 180 degrees around the circumference of said pipe section from said radially-outwardly facing opening of said first elongated channel, and;
   b) installing at least one umbilical line in said first elongated channel through said radially-outward facing opening of said first channel; and
   c) lowering said at least one umbilical line, pipe section and encasement apparatus into a rotary table of a drilling rig.

7. The method of claim 6, wherein said first encasement member defines a first outer surface, said second encasement member defines a second outer surface, and said at least one umbilical line does not extend radially outward beyond said first and second outer surfaces when installed in said first elongated channel.

8. The method of claim 6, wherein said encasement apparatus protects said at least one umbilical line against damage caused by contact with other objects.

9. The method of claim 6, wherein said first and second encasement members are attached to each other using at least one mechanical fastener.

10. The method of claim 6, wherein said at least one encasement apparatus protects said at least one umbilical line while said pipe section is installed within a riser of a floating drilling rig or other vessel.

* * * * *